(12) United States Patent
Molaug

(10) Patent No.: US 7,488,019 B2
(45) Date of Patent: Feb. 10, 2009

(54) TOOL FOR CONNECTION AND DISCONNECTION OF CARGO

(76) Inventor: Ole Molaug, Tytebaerholen 30, Bryne (NO) N-4340

( * ) Notice: Subject to any disclaimer, the term of this patent is extended or adjusted under 35 U.S.C. 154(b) by 235 days.

(21) Appl. No.: 10/577,533

(22) PCT Filed: Oct. 27, 2004

(86) PCT No.: PCT/NO2004/000325

§ 371 (c)(1),
(2), (4) Date: Jan. 10, 2007

(87) PCT Pub. No.: WO2005/040032

PCT Pub. Date: May 6, 2005

(65) Prior Publication Data

US 2007/0222243 A1    Sep. 27, 2007

(30) Foreign Application Priority Data

Oct. 28, 2003  (NO) ................... 20034842

(51) Int. Cl.
*B66C 1/34* (2006.01)
(52) U.S. Cl. .................. 294/82.31; 294/82.34
(58) Field of Classification Search ............ 294/82.15, 294/82.24, 82.3, 82.31, 82.34, 118, 119
See application file for complete search history.

(56) References Cited

U.S. PATENT DOCUMENTS 3,109,676 A * 11/1963 Mercer .................... 294/82.31
3,625,558 A * 12/1971 Johnson ................... 294/82.31
4,077,661 A *  3/1978 Inahashi .................... 294/82.3
4,095,833 A    6/1978 Lewis
4,416,480 A   11/1983 Moody
5,178,427 A *  1/1993 Jorritsma ................. 294/82.36
6,241,298 B1* 6/2001 Whyte et al. ............. 294/82.36

FOREIGN PATENT DOCUMENTS

| DE | 3801483 | 1/1988 |
|---|---|---|
| DE | 39 38 364 | 5/1991 |
| WO | WO86/07582 | 12/1986 |

OTHER PUBLICATIONS

Written Opinion of the International Searching Authority, Feb. 22, 2005.
International Preliminary Report on Patentability, Oct. 28, 2003.

* cited by examiner

*Primary Examiner*—Dean J Kramer
(74) *Attorney, Agent, or Firm*—Andrus, Sceales, Starke & Sawall, LLP

(57) ABSTRACT

A tool (1) for connection and disconnection of a cargo item (8), in which the tool (1) comprises a suspension (2) and a lifting hook (4), and in which the lifting hook (4) is rotatably connected, about its suspension axis (40), to the suspension (2), wherein the lifting hook (4) is connected to an actuator (22, 28, 32, 70) via a transmission (44, 46, 48, 50, 54, 60), the actuator (22, 28, 32, 70) being arranged to allow it to rotate the lifting hook (4) about the suspension axis (40).

8 Claims, 5 Drawing Sheets

ND DISCONNECTION OF CARGO

TOOL FOR CONNECTION AND DISCONNECTION OF CARGO

CROSS REFERENCE TO RELATED APPLICATION

The present application is the U.S. national stage application of International Application PCT/NO2004/000325, filed Oct. 27, 2004, which international application was published on May 6, 2005 as International Publication WO 2005/040032. The International Application claims priority of Norwegian Patent Application 20034842, filed Oct. 28, 2003.

BACKGROUND OF THE INVENTION

This invention concerns a tool for connection and disconnection of cargo. More particularly, it concerns a tool in which the lifting hook of the tool is arranged for it to be rotatable about its suspension axis, said hook being remote-controlled by means of an actuator. If the lifting hook is rotated sufficiently about its suspension axis, the lifting hook will enable the disconnection of a cargo item connected to the lifting hook.

Hereinafter, the term "hook" is used for the lifting hook. Terms such as "upper", "lower", etc. reflect the positioning when the tool is used in association with a lifting device, and the terms generally imply no limitation concerning the spatial orientation of the device.

When lifting a cargo item, it is common to place a connecting tool of the cargo item, for example in the form of a connection ring or a strap, in a hook. To prevent the connecting tool from unintentionally being released from the hook when the lift is unloaded, it is a statutory requirement that a device arranged to prevent such an occurrence is present in association with the hook.

In order to comply with the statutory requirement, it is common to provide the hook with a spring-biased locking dog projecting over the opening of the hook and being arranged for rotation inwards into the opening of the hook only. In another prior art solution, the locking dog is a fixed part of the suspension of the hook, whereas the hook is lockable and rotatable about its own suspension axis.

The locking dog of the hook presupposes that cargo at the unloading location cannot be disconnected from the hook without carrying out a manual work operation. Thus, it is common to employ a person at the disconnection location substantially solely to disconnect the cargo from the hook.

SUMMARY OF THE INVENTION

The object of the invention is to remedy or restrict at least one of the disadvantages of prior art.

The object is achieved according to the invention and by means of the features disclosed in the description below and in the subsequent claims.

By rotating the hook about its suspension axis by means of a actuator, preferably being remote-controlled, it is possible for a crane driver, for example, to disconnect a cargo item without assistance from a person located at the disconnection location.

It is of great importance, however, to ensure that the cargo item cannot be unintentionally disconnected from the hook. According to the invention, this precautionary function is maintained preferably by means of a mechanical interlocking presupposing that the hook must be unloaded, and that the actuator must be released, remote-controlled or manually, in order for disconnection of the cargo item to occur.

In a preferred embodiment, the hook is load-bearingly connected to a middle centre-cross of a pair of double-scissors located in the suspension. The lower centre-cross of the pair of scissors is rotatably connected to the suspension of the tool, whereas a transmission for the rotating action of the hook may be releasably connected to the upper centre-cross of the pair of scissors.

The pair of scissors is resiliently biased in the direction of its extended position. The tool makes use of the fact that the distance covered by the upper centre-cross relative to the suspension, is twice the length of the distance covered by the middle centre-cross.

This characteristic is used for loading, interlocking and releasing the hook, such as explained in greater detail in the specific part of the description.

Using a tool according to the invention ensures that a cargo item placed in the hook may not be unintentionally disconnected from the hook, and that disconnection of the cargo item may occur without requiring a person to be present at the disconnection location.

BRIEF DESCRIPTION OF THE DRAWINGS

In the following, a non-limiting example of a preferred embodiment is described and illustrated on the attached drawings, in which.

DETAIL DESCRIPTION OF THE INVENTION

Figure 1:
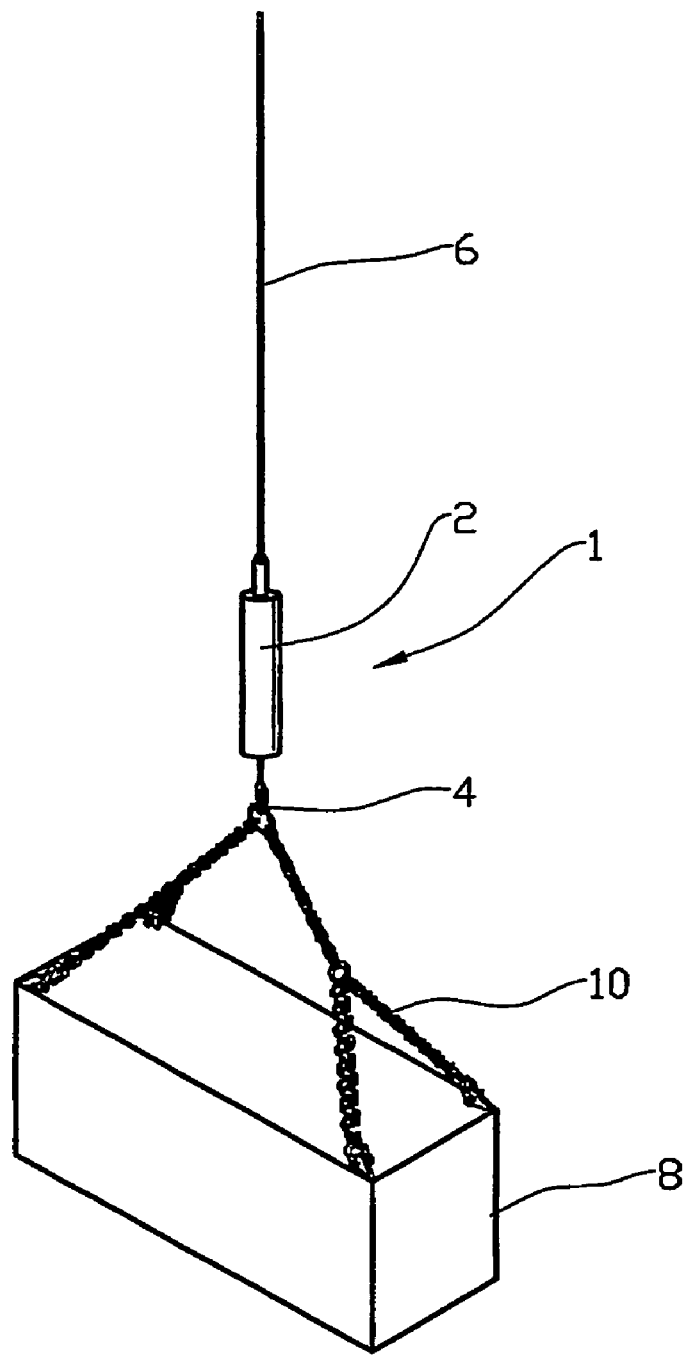
FIG. 1 shows a tool connected to a lifting wire, in which a cargo item is placed in the hook of the tool.

On the drawings, reference numeral 1 denotes a tool comprising a suspension 2 and a hook 4, in which the suspension 2 is connected to a lifting wire 6 of a lifting crane (not shown), and in which a lifting strap 10 of a cargo item 8 is suspended in the hook 4.

Figure 2:
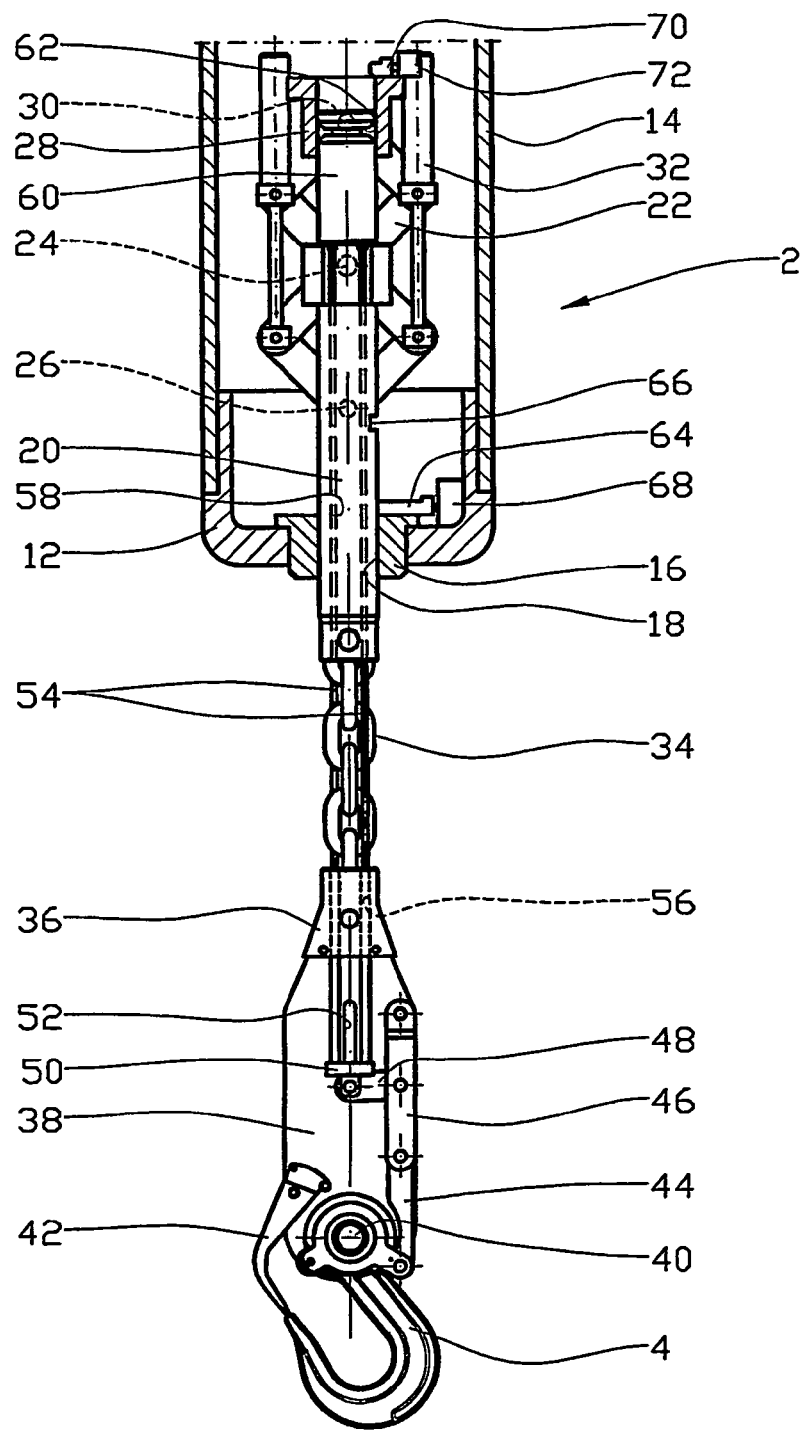
FIG. 2 shows, partly schematically and in larger scale, a section of the suspension of the tool and an actuator for releasing the hook, the hook being in its unloaded position.

By means of screw connections (not shown), an end lid 12 is connected to a housing 14 of the suspension 2, see FIG. 2. A guide bearing 16 is provided in the end lid 12, the guide bearing 16 being provided with concentric, through-going bore 18 relative to a longitudinal axis of the tool 1.

A guide rod 20 is movably provided in the bore 18. At its upper end portion, the guide rod 20 is connected to a middle centre-cross of a pair of double-scissors 22 by means of a middle bearing 24. In a practical embodiment, the suspension is provided with a pair of double-scissors 22 at each side of the guide rod 20. For illustrative reasons, the drawings only show one pair of double-scissors 22.

At its lower centre-cross, the pair of double-scissors 22 is connected to the end lid 12 by means of a lower bearing 26, and at its upper centre-cross to a centre sleeve 28 by means of an upper bearing 30.

Between its two adjacent side crosses, the pair of double-scissors 22 is provided with respective springs 32, here in the form of gas springs, the gas springs 32 being arranged to resiliently bias the pair of double-scissors 22 in the direction of its extended position.

At its opposite end portion, the guide rod 20 is connected to two support plates 38 via a chain connection 34 and a connector 36. On the drawing, one support plate 38 is removed.

Rotatable about its suspension axis 40, the hook 4 is connected to the support plates 38. The hook 4 together with the support plates 38, the connector 36, the chain connection 34, the guide rod 20, the pair of double-scissors 22, the end lid 12 and the housing 14, constitute the load-bearing structure of the tool. In a practical embodiment (not shown), when the guide rod 20 is in its lower, load-bearing position, the upper portion of the guide rod 20 lands against the end lid 12 in order for the pair of double-scissors 22 not to be exposed to the entire lifting force.

A spring-loaded locking dog 42 is provided in a known manner near the hook 4.

A first link arm 44 is rotatably connected to the hook 4 at its first end portion. At its second end portion, the first link arm 44 is rotatably connected to a first end portion of a second link arm 46. The opposite end portion of the second link arm 46 is rotatably connected to the support plates 38.

At its middle portion, the second link arm 46 is connected to one end portion of a locking joint 48. The opposite end portion of the locking joint 48 is rotatably connected to a guide 50, guide 50 being arranged to be movable along vertical guideways 52 in the support plates 38.

Figure 3:
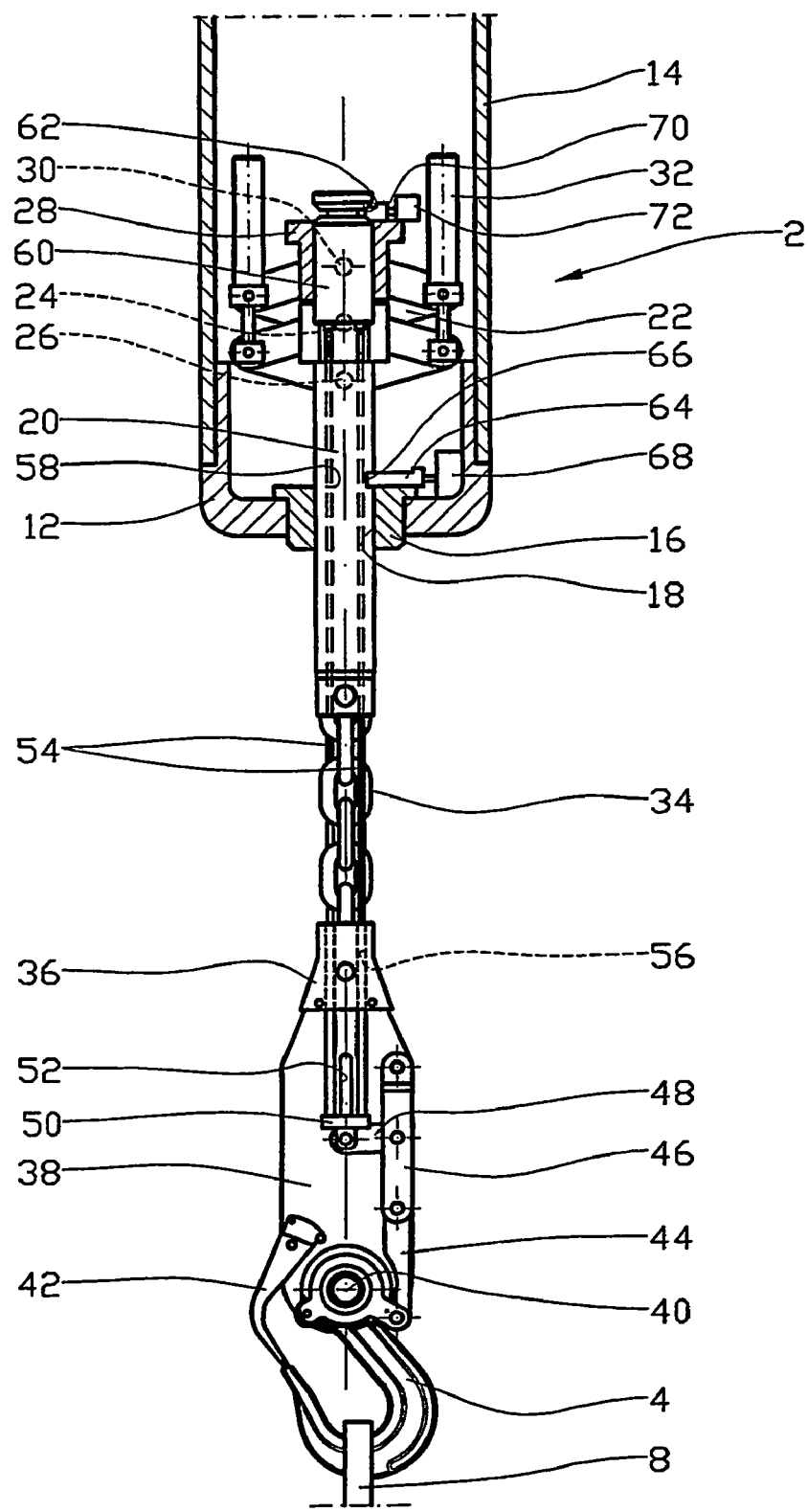
FIG. 3 shows the same as in FIG. 2, but here the hook is in its load-bearing position.

When the guide 50 is in its lower, locking position in the guideway 52, see FIGS. 2 and 3, the locking joint 48 maintains the second link arm 46 in position and prevents it from rotating about its connection in the support plates 38. Thereby, the first link arm 44 is also locked in its position, whereby the hook 4 is prevented from rotating about its suspension axis 40.

Two release lines 54 extend from the guide 50 through corresponding bores 56 in the connector 36, bores 58 in the guide rod 20 and up to a locking piece 60. At its upper portion, the locking piece 60 is provided with a locking groove 62.

A first locking arm 64, which is movably connected to the guide bearing 16, is arranged to grip, in a spring-biased manner, the guide rod 20 in a catch groove 66, see FIG. 3. The first locking arm 64 may be pulled out of the catch groove 66 by means of a first trigger 68.

A second locking arm 70, which is movably connected to the centre sleeve 28, is arranged to grip, in a spring-biased manner, the locking piece 60 in the locking groove 62, see FIG. 3. The second locking arm 70 may be pulled out of the locking groove 62 by means of a second trigger 72.

The pair of double-scissors 22, the centre sleeve 28, the gas springs 32 and the second locking arm 70, constitute an actuator. The first link arm 44, the second link arm 46, the locking joint 48, the guide 50, the release lines 54 and the locking piece 60, comprise a transmission between said actuator and the hook 4.

The triggers 68 and 72 are controlled via an electric control unit 74. The control unit 74 receives control signals from a radio transmitter 78 provided with a switch 76, the radio transmitter 78 transmitting a signal to a receiver 80 connected to the control unit 74. An accumulator 82 supplies energy to the control unit 74.

The initial position of the tool 1 is shown in FIG. 2. In this position, the pair of double-scissors 22 is extended outwards, inasmuch as the gas springs 32 have overcome the weight of the connected, movable parts.

The guide rod 20 is thus displaced somewhat into the end lid 12. The locking piece 60 extends somewhat into the centre sleeve 28.

When a cargo item 8 is lifted, see FIG. 3, the force from the gas springs 32 is overcome, whereby the pair of double-scissors 22 is pushed together as the guide rod 20 is displaced somewhat out of the end lid 12. The guide rod 20 is locked in this position by the first locking arm 64 being displaced into the catch groove 66.

Due to the design of the pair of double-scissors 22, the relative displacement length of the upper bearing 30 is twice the length of the displacement length of the middle bearing 24. This causes the locking piece 60 to displace further up through the centre sleeve 28, allowing the second locking arm 70 to seize the locking groove 62 of the locking piece 60.

In this position, the tool 1 is loaded in the sense that sufficient energy is stored in the gas springs 32 to enable rotation of the hook 4 about its suspension axis 40. However, the hook 4 is safeguarded against unintentional disconnection by the first locking arm 64 preventing a displacement of the guide rod 20 in the end lid 12, even if the tool 1 is unloaded.

When the cargo item 8 is to be disconnected from the hook 4, the tool 1 must be unloaded in order to allow the gas springs 32 to displace the guide rod 20 upwards. Moreover, the first locking arm 64 must be displaced out of its locking position in the catch groove 66.

The first locking arm 64 is displaced out of the catch groove 66 by the switch 76 of the radio transmitter 78 being operated a first time. A signal is transmitted to the control unit 74 from the radio transmitter 78 via the receiver 80. The control unit 74 is programmed to interpret this first signal such that the first trigger 68 is to be activated. The first trigger 68 thereby displaces the first locking arm 64 out of its locking position.

Figure 4:
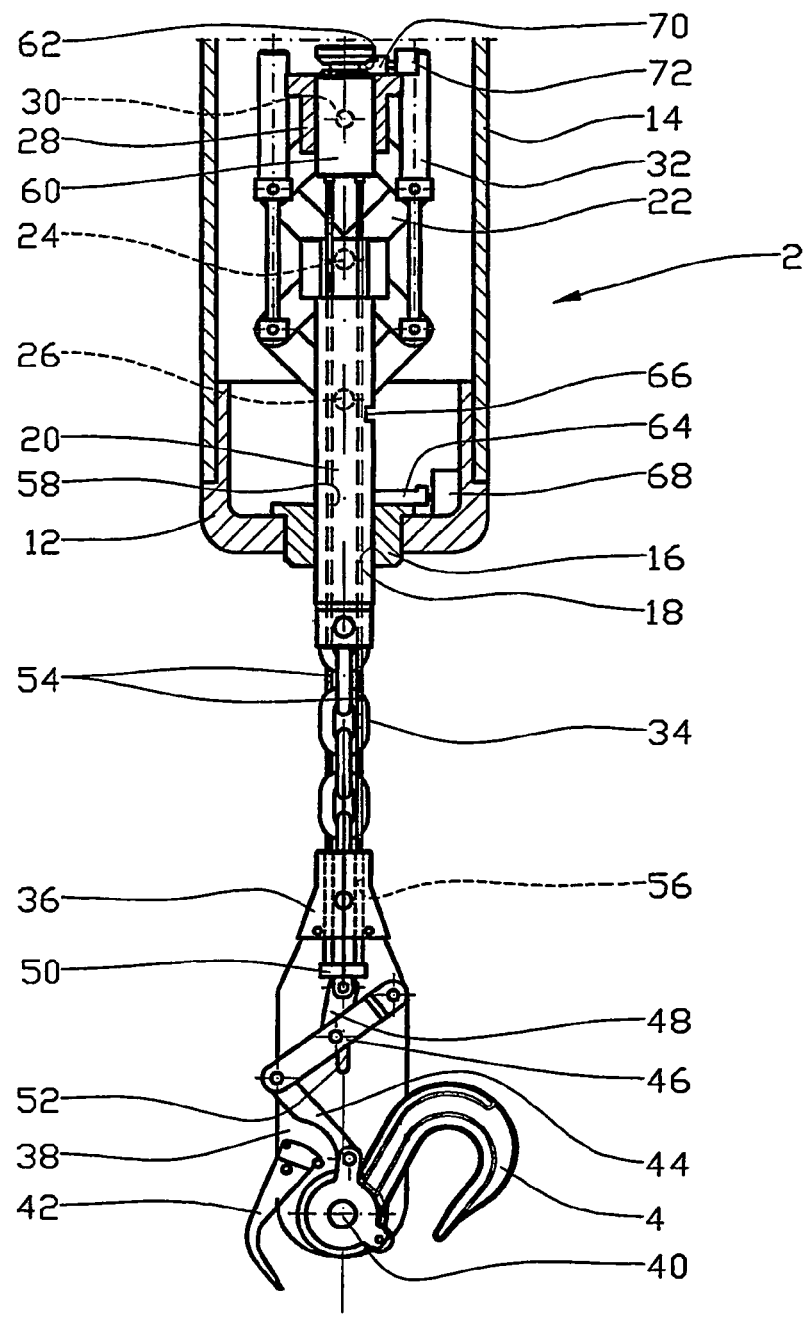
FIG. 4 shows the same as in FIG. 2, but here the hook is in its released position.
Figure 5:
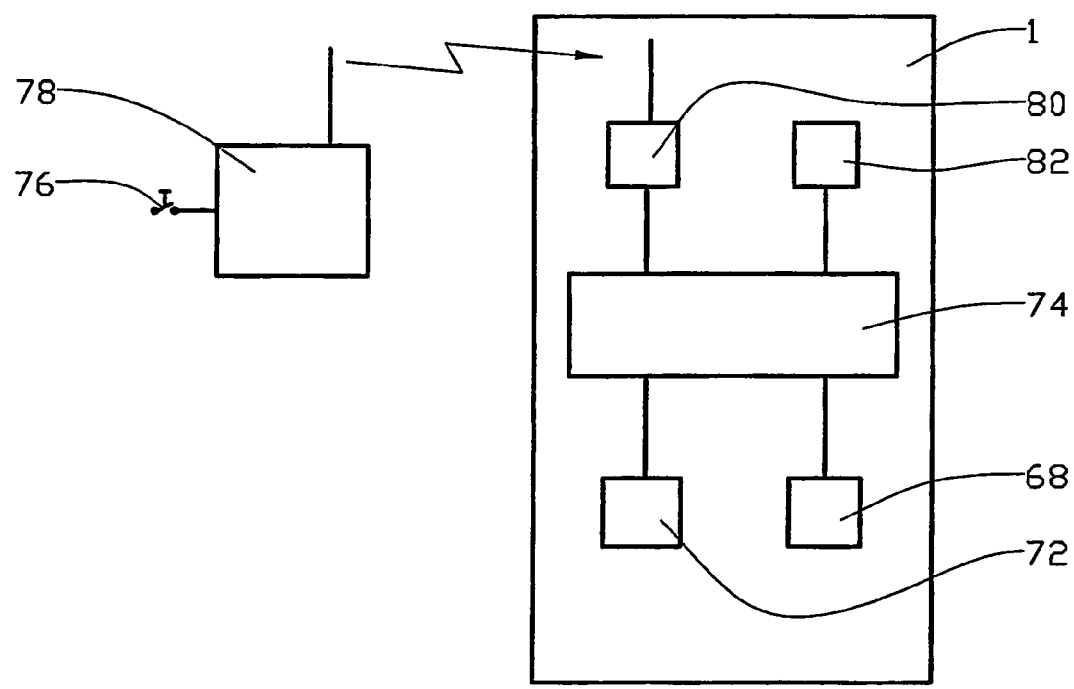
FIG. 5 shows schematically a connection diagram of the remote control of the tool.

Thereafter, the gas springs 32 may freely displace the pair of double-scissors to its extended position, see FIG. 4. The locking piece 60, which is connected to the centre sleeve 28 by means of the second locking arm 70, is thus displaced twice the length upwards relative to that of the guide rod 20. Thereby, the release lines 54 displace the guide 50 upwards in the guideway 52. This causes the second link arm 46 to rotate about its connection in the support plate 38, whereby the hook 4 is rotated about its suspension axis 40 by means of the first link arm 44.

By operating the switch 76 a second time, a signal is provided, the signal of which the control unit 74 is programmed to interpret such that the second trigger 72 is to be activated. The second trigger 72 thereby displaces the second locking arm 70 out of its locking position in the locking groove 62. Thus, the locking piece 60 may be displaced downwards in the centre sleeve 28, whereby the guide 50 is displaced downwards in the guideway 52. This causes the hook 4 to rotate to its initial position, see FIG. 2.

The invention claimed is:

1. A tool for connection and disconnection of a cargo Item, in which the tool comprises a suspension and a lifting hook, and in which the lifting hook is rotatably connected, about its suspension axis, to the suspension, where the lifting hook is connected to an actuator via a transmission, the actuator, being arranged to allow it to rotate the lifting hook about the suspension axis, wherein the lifting hook is articulately connected to a middle centre-cross of a pair of double-scissors by means of a middle bearing, a lower center-cross of the pair of double-scissors being articulately connected to the suspension of the tool by means of a lower bearing, and wherein a transmission provided for the rotating function of the hook about its suspension axis is realeasably connectable to an upper center-cross of the pair of double-scissors by means of an upper bearing.

2. The tool according to claim 1, wherein the pair of double-scissors is resiliently biased in the direction of its extended position by means of a spring.

3. The tool according to claim 1, wherein a load-bearing guide rod moving in the suspension is lockable relative to the suspension.

4. The tool according to claim 3, wherein the guide rod is arranged to be locked in the suspension by means of a first locking arm.

5. The tool according to claim 4, wherein the first locking arm is remotely releasable by means of a first trigger.

6. The tool according to claim 5, wherein the first trigger is activated by means of radio transmitter, a receiver and a control unit.

7. The tool according to claim 1, wherein a second link arm, which is arranged to allow it to rotate the lifting hook about the suspension axis of the hook by means of rotating a first link arm about a connection point, is connected to a guide by means of a locking joint.

8. The tool according to claim 7, wherein the direction between the connection point of the locking joint substantially is perpendicular relative to the longitudinal axis of the second link arm and a guideway for the guide when the locking joint is its locking position.

* * * * *